United States Patent [19]
Leibowitz et al.

[11] Patent Number: 5,535,402
[45] Date of Patent: Jul. 9, 1996

[54] SYSTEM FOR (N•M)-BIT CORRELATION USING N M-BIT CORRELATORS

[75] Inventors: Lawrence M. Leibowitz, Fairfax; Tuan A. Mai, Falls Church, both of Va.

[73] Assignee: The United States of America as represented by the Secretary of the Navy, Washington, D.C.

[21] Appl. No.: 876,151

[22] Filed: Apr. 30, 1992

[51] Int. Cl.$^6$ ................................................ G06F 15/336
[52] U.S. Cl. .............. 395/800; 364/728.03; 364/DIG. 1; 364/265
[58] Field of Search ...................... 395/275, 325, 395/550, 800; 364/728.03; 341/122–124, 173, 183; 342/189

[56] References Cited

U.S. PATENT DOCUMENTS

| | | | |
|---|---|---|---|
| 3,604,911 | 9/1971 | Schmitt | 235/181 |
| 3,796,868 | 3/1974 | Kaul et al. | 235/181 |
| 3,903,405 | 9/1975 | Gaskill, Jr. | 235/152 |
| 4,412,301 | 10/1983 | Strubeck | 364/728 |
| 4,498,141 | 2/1985 | Cooper | 364/728 |
| 4,660,164 | 4/1987 | Leibowitz | 364/782 |
| 4,816,805 | 3/1989 | Vojir et al. | 341/83 |
| 4,903,225 | 2/1990 | Brost | 364/728.03 |
| 5,022,047 | 6/1991 | Dixon et al. | 375/1 |
| 5,056,055 | 10/1991 | Shinonaga | 364/821 |
| 5,101,208 | 3/1992 | Parker et al. | 342/45 |
| 5,214,391 | 5/1993 | Serizawa et al. | 455/303 |
| 5,218,562 | 6/1993 | Basehore et al. | 364/728.03 |
| 5,239,496 | 8/1993 | Vancraeynest | 364/728.03 |

*Primary Examiner*—Mehmet B. Geckil
*Attorney, Agent, or Firm*—Thomas E. McDonnell; George Jameson

[57] ABSTRACT

An extended length digital correlator threshold circuit for (N·M)-bit correlation using N M-bit correlators is disclosed. For the exemplary case where N=2, the digital correlator threshold circuit comprises: a first circuit for storing a preselected code word having first and second digital code portions; a first correlator responsive to the first digital code portion and an input digital data stream passing therethrough for periodically producing a first multibit number representative of the number of bit agreements between the bits in the digital data stream and the bits in the first digital code portion; a second correlator responsive to the second digital code portion and the digital data stream passing therethrough from the first correlator for periodically producing a second multibit number representative of the number of bit agreements between the bits in the digital data stream from the first correlator and the bits in the second digital code portion; and a second circuit responsive to said first and second multibit numbers for generating an output signal when the combined number of bit agreements in both of the first and second multibit numbers is at least equal to a preselected threshold number.

20 Claims, 6 Drawing Sheets

SYSTEM FOR (N•M)-BIT CORRELATION USING N M-BIT CORRELATORS

BACKGROUND OF THE INVENTION

1. Field of the Invention

The present invention relates to a digital correlation threshold circuit for providing an efficient means of achieving digital correlation with thresholding to a bit sequence of length up to N·M using N M-bit correlators.

2. Description of the Prior Art

Commonly available digital correlator integrated circuits (ICs) provide for the correlation of bit sequences of up to a length M (typically 32 to 64). The correlation output of such a device is from 0 to M and consists of ($\log_2 M+1$) bits. This output is generally compared to a preset threshold by ($\log_2 M+1$)-bit circuitry usually provided on an IC device. It is often necessary to correlate sequences of up to length N·M using N correlators where N>2. This is accomplished by the serial connection of N correlator devices. The resulting correlation of up to N·M bits was previously achieved by summing the outputs of the N correlators and then applying a threshold using a ($\log_2 (N·M)+1$)-bit comparator. This involves a multitude of adders and a comparator that results in considerable propagation delay and tends to produce spurious outputs.

OBJECTS OF THE INVENTION

Accordingly, one object of the invention is to provide an improved digital correlator threshold circuit.

Another object of the invention is to provide a simplified, reliable and low-cost digital correlator.

Another object of the invention is to provide an improved digital threshold circuit with relatively high threshold values.

A further object of the invention is to provide a digital correlation circuit, and method therefor, for thresholding to a bit sequence of length up to N·M using N M-bit correlators.

SUMMARY OF THE INVENTION

These and other objects of the invention are achieved by providing a digital threshold circuit which, for example, is comprised of: first and second serially-coupled correlators respectively responsive to first and second digital code portions of a preselected code word and to an data stream passing through the first and second serially-coupled correlators for periodically producing first and second multibit numbers, respectively, in response to a first and second digital code portion of a preselected code word from a programmable memory device and an input data stream passing therethrough. The first and second multibit numbers are representative of the number of bit agreements between the bits in the digital data stream and the bits in the first and second digital code portion. When a programmable logic array determines that the combined number of bit agreements in both the first and second multibit numbers are at least equal to a preselected threshold number an output signal is generated. The example of the utilization of two correlators (first and second correlators) extends in a straightforward manner to other embodiments of the invention where more than two correlators can be utilized (where N is greater than 2 correlators).

BRIEF DESCRIPTION OF THE DRAWINGS

These and other objects, features and advantages of the invention, as well as the invention itself, will become better understood by reference to the following detailed description when considered in connection with the accompanying drawings wherein like reference numerals designate identical or corresponding parts throughout the several views and wherein.

DETAILED DESCRIPTION OF THE PREFERRED EMBODIMENT

As stated before, it is often necessary to correlate bit sequences of up to length N·M using N M-bit correlators, where N>2 and M typically has a bit length of 32 or 64. For ease of understanding, the invention will be described for the case where N=2 and M=64. In this case the correlation involves a bit sequence of length 128 using two correlator devices, each of length 64.

Figure 1:
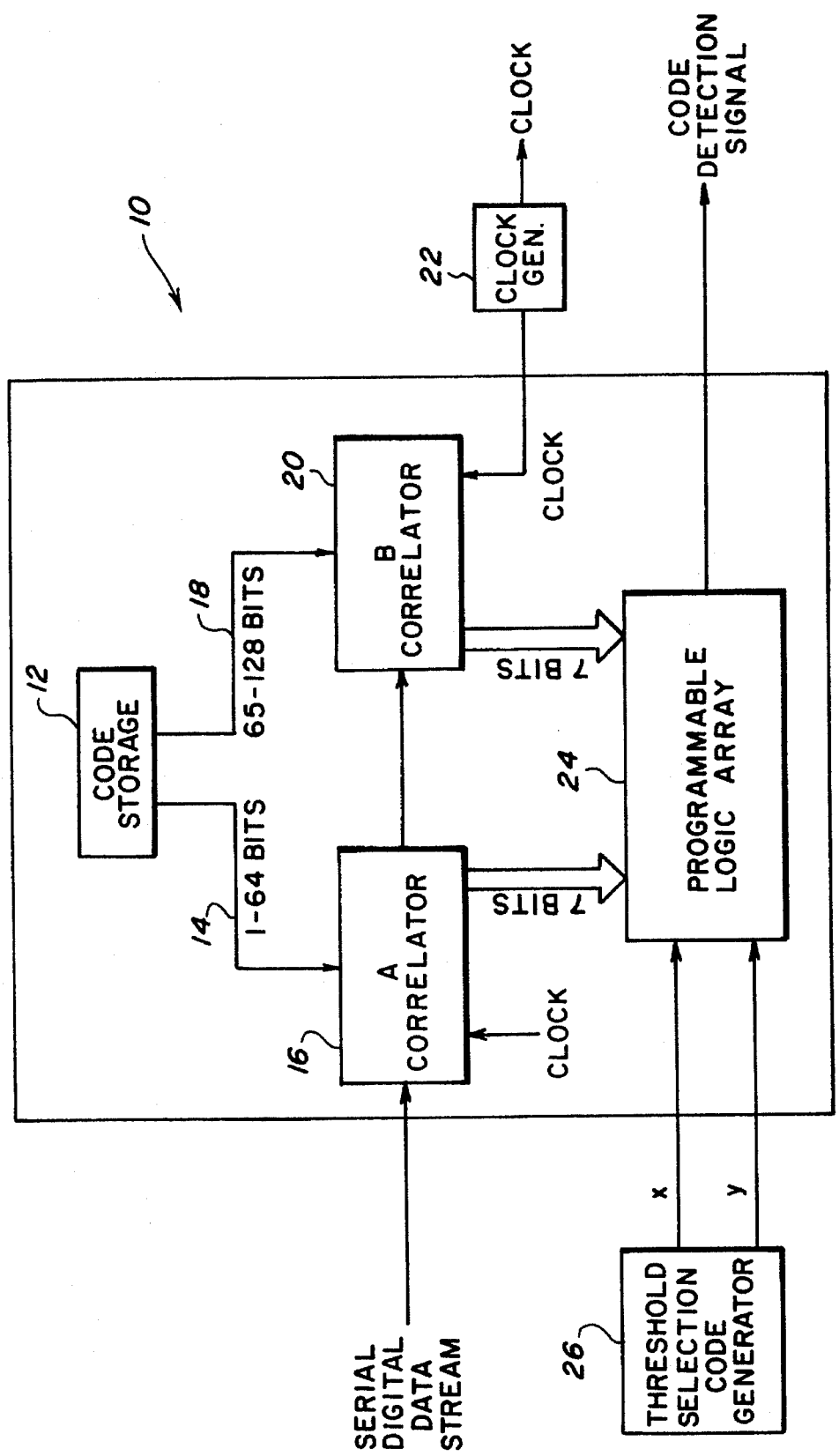
FIG. 1 illustrates a schematic block diagram of a preferred embodiment of the digital threshold circuit of the invention.

Referring now to the drawings, FIG. 1 illustrates a schematic block diagram of a preferred embodiment of the digital correlator threshold circuit 10 of the invention. For purposes of this discussion, assume that the digital correlator threshold circuit 10 is searching an input serial digital data stream for the presence of a particular 128-bit digital code in that input data stream. The preselected 128-bit digital code is stored in a code storage device 12. The code storage device 12 can be a programmable read-only memory, a computer, a shift register or any other device suitable for storing a 128-bit digital code. The 128-bit digital code is split into two 64-bit code portions, with the first 64-bit code portion containing bits 1–64 and the second 64-bit code portion containing bits 65–128. Bits 1–64 of the first code portion are applied in parallel over a composite line 14 and stored in a reference register (not shown) in an A correlator 16, while bits 65–128 of the second code portion are applied in parallel over a composite line 18 and stored in a reference register (not shown) in a B correlator 20.

The A correlator 16 is cascade-coupled to the B correlator 20. Each of the correlators 16 and 20 is a 64-bit monolithic, all-digital correlator with a 7-bit digital output. An exemplary type of correlator that can be used in this invention is the TRW correlator having part number TDC 1023J.

In operation, the input serial digital data steam is sequentially clocked through a data register (not shown) in the A correlator 16 and a data register (not shown) in the B correlator 20 by clocks from a clock generator 22. At each clock time the 64 bits in the data register in each of the correlators 16 and 20 are correlated with the 64 bits in the associated reference register in that correlator to develop a 64-bit number having a 1-state output at each bit position where there is a bit-agreement. Thus, in each of the correlators 16 and 20 the number of 1-state outputs in the 64-bit number is indicative of the number of associated bits that are in agreement. The 64-bit number in each of the correlators 16 and 20 is translated by a 64-to-7 translation circuit (not shown) in the TRW - TDC 1023J correlator to a 7-bit multibit number that represents the number of bit agreements between the 64 bits in the data register in each of the correlators 16 and 20 and the corresponding 64 bits in the associated reference register in that correlator.

At each clock time, each 7-bit multibit number from either of the correlators 16 and 20 can represent any number between 0000000 (representing no bit agreements) and 1000000 (representing 64 bit agreements between the two 64-bit quantities being correlated in each correlator). Each of the correlators 16 and 20 can have up to 64 bit agreements between its associated data and reference registers, with a maximum total of 128 bit agreements between the two correlators 16 and 20. Thus, a total output of 128 (from both of the correlators 16 and 20) requires that both of the correlators 16 and 20 have outputs of 64. A total output of 127 occurs when the output of correlator 16 is 64 and the output of correlator 20 is 63, or when the output of correlator 16 is 63 and the output of correlator 20 is 64. In a similar manner, the conditions for each of the correlated outputs of 125 and 126 are shown in TABLE 1, below.

TABLE 1

| A Corr. 16 Output | Binary Code A | B Corr. 20 Output | Binary Code B | Combined Correlator Output |
|---|---|---|---|---|
| 64 | 1000000 | 64 | 1000000 | 128 |
| 64 | 1000000 | 63 | 0111111 | 127 |
| 63 | 0111111 | 64 | 1000000 | 127 |
| 64 | 1000000 | 62 | 0111110 | 126 |
| 63 | 0111111 | 63 | 0111111 | 126 |
| 62 | 0111110 | 64 | 1000000 | 126 |
| 64 | 1000000 | 61 | 0111101 | 125 |
| 63 | 0111111 | 62 | 0111110 | 125 |
| 62 | 0111110 | 63 | 0111111 | 125 |
| 61 | 0111101 | 64 | 1000000 | 125 |

The occurrence of an output n from A correlator 16 is indicated by the Boolean variable $A_n$ and the occurence of output m from B correlator 20 is indicated by $B_m$. When the logical product $A_n \cdot B_m$ is a "1", the total output of both of the correlators 16 and 20 is n+m. The output of n+m=128 can only occur when n=m=64 which is indicated by the logical variable $Z_{n+m}=Z_{128}=A_{64} \cdot B_{64}$. An output of 127 results when correlators 16 and 20 have outputs 64 and 63 respectively, or 63 and 64, respectively. Therefore, $$Z_{127} = A_{64} \cdot B_{63} + A_{63} \cdot B_{64}$$

and $$Z_{126} = A_{64} \cdot B_{62} + A_{63} \cdot B_{63} + A_{62} \cdot B_{64}$$

$$Z_{125} = A_{64} \cdot B_{61} + A_{63} \cdot B_{62} + A_{62} \cdot B_{63} + A_{61} \cdot B_{64}$$

Exceeding a correlation threshold t involves the logical sum of all correlator output conditions such that t>(n+m). Therefore, $$T_t = \sum_{t \geq n+m} A_n \cdot B_m$$

and thus $$T_{128} = Z_{128}$$
$$\phantom{T_{127}} = A_{64} \cdot B_{64}$$
$$T_{127} = Z_{128} + Z_{127}$$
$$\phantom{T_{127}} = A_{64} \cdot B_{64} + A_{64} \cdot B_{63} + A_{63} \cdot B_{64}$$
$$T_{126} = Z_{128} + Z_{127} + Z_{126}$$
$$\phantom{T_{126}} = A_{64} \cdot B_{64} + A_{64} \cdot B_{63} + A_{63} \cdot B_{64} + A_{64} \cdot B_{62} +$$
$$\phantom{T_{126} =} A_{63} \cdot B_{63} + A_{62} \cdot B_{64}$$
$$T_{125} = Z_{128} + Z_{127} + Z_{126} + Z_{125}$$
$$\phantom{T_{125}} = A_{64} \cdot B_{64} + A_{64} \cdot B_{63} + A_{63} \cdot B_{64} + A_{64} \cdot B_{62} +$$
$$\phantom{T_{125} =} A_{63} \cdot B_{63} + A_{62} \cdot B_{64} + A_{64} \cdot B_{61} + A_{63} \cdot B_{62} +$$
$$\phantom{T_{125} =} A_{62} \cdot B_{63} + A_{61} \cdot B_{64}$$

It can be seen that there is only one combination of the outputs of the correlators 16 and 20 that corresponds to the threshold of 128, three combinations that correspond to the threshold of 127, six combinations that correspond to the threshold of 126, and ten combinations that correspond to the threshold of 125. Thus thresholds of 125 or greater can be achieved through the selection of up to ten logical terms formed from among the 14 bits in the outputs of the correlators 16 and 20.

The two 7-bit multibit numbers from the correlators 16 and 20 are applied to a programmable logic array (PLA) 24. It should be noted at this time that the structure for deriving the thresholds of 128, 127, 126 and 125 in conformance with the above-discussed threshold equations are contained in the PLA 24. The PLA 24, which will be discussed in detail later, can be an exemplary programmable logic array manufactured by Signetics with part number 82S152.

A 2-bit selection signal, xy, (where xy=x·y) is applied from a threshold selection code generator 26 to the PLA 24 to cause the PLA 24 to only generate a code detection signal when the total number of bit agreements of the two 7-bit multibit numbers equals or exceeds a threshold value determined by a desired selection signal. The values of the 2-bit selection signal xy can be controlled to produce various threshold values, as indicated in the following TABLE 2.

TABLE 2

| x,y | Threshold Value |
|---|---|
| 0 0 | 125 |
| 0 1 | 126 |
| 1 0 | 127 |
| 1 1 | 128 |

As shown in TABLE 2, an xy setting of 00 produces a threshold value of 125 ($T_{125}$), an xy setting of 01 produces a threshold value of 126 ($T_{126}$), an xy setting of 10 produces a threshold value of 127 ($T_{127}$), and an xy setting of 11 produces a threshold value of 128 ($T_{128}$). The threshold value for $T_{128}$ occurs only when there is a maximum total of 128 bit agreements between the two correlators 16 and 20.

The selection code generator 26 can be a pair of switches, a computer or any other means for manually, mechanically or electronically producing an exemplary 2-bit selection signal xy indicative of any desired one of a plurality of threshold levels.

Figure 2:
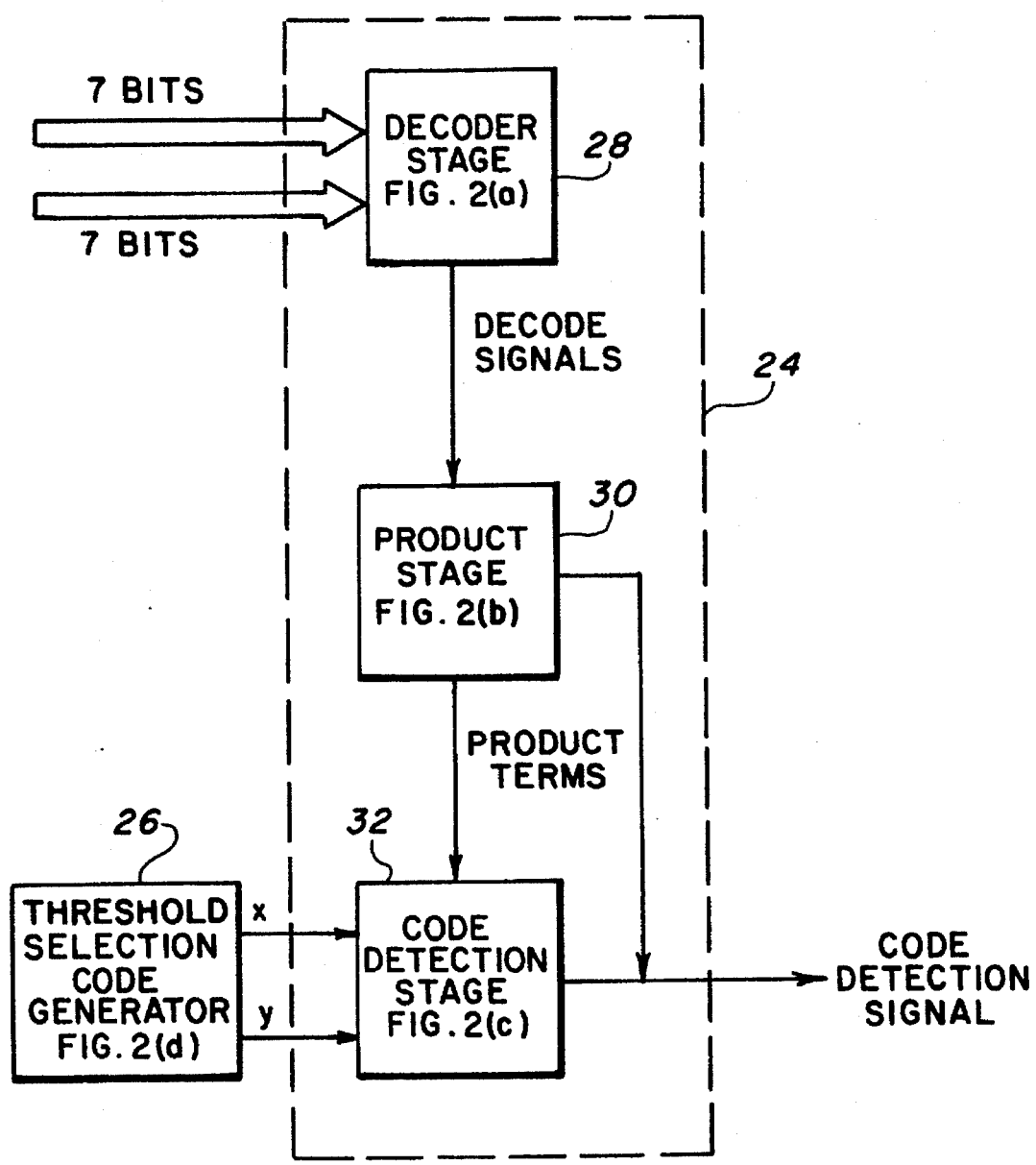
FIG. 2 illustrates a schematic block diagram of the required logical functions that are provided by the programmable logic array of FIG. 1.

Referring now to FIG. 2, a schematic block diagram of the logic provided by PLA 24 and the threshold selection code generator 26 is shown. The logic provided by the PLA 24 is comprised of a decoder stage 28, a product stage 30 and a code detection stage 32. The two 7-bit multibit numbers from the correlators 16 and 20 are applied to the decoder stage 28 to enable the decoder stage 28 to develop and apply a plurality of "decode signals" to the product stage 30. In response to the plurality of decode signals, the product stage 30 develops and applies a plurality of "product signals" to the code detection stage 32. The code detection stage 32 utilizes these product signals and the threshold selection code from the threshold selection code generator 26 to only generate a code detection signal when the total number of bit agreements of the two 7-bit multibit numbers equals or exceeds the threshold value specified by the input threshold selection signal. Each of these stages of the PLA 24 will now be discussed.

Figure 2A:
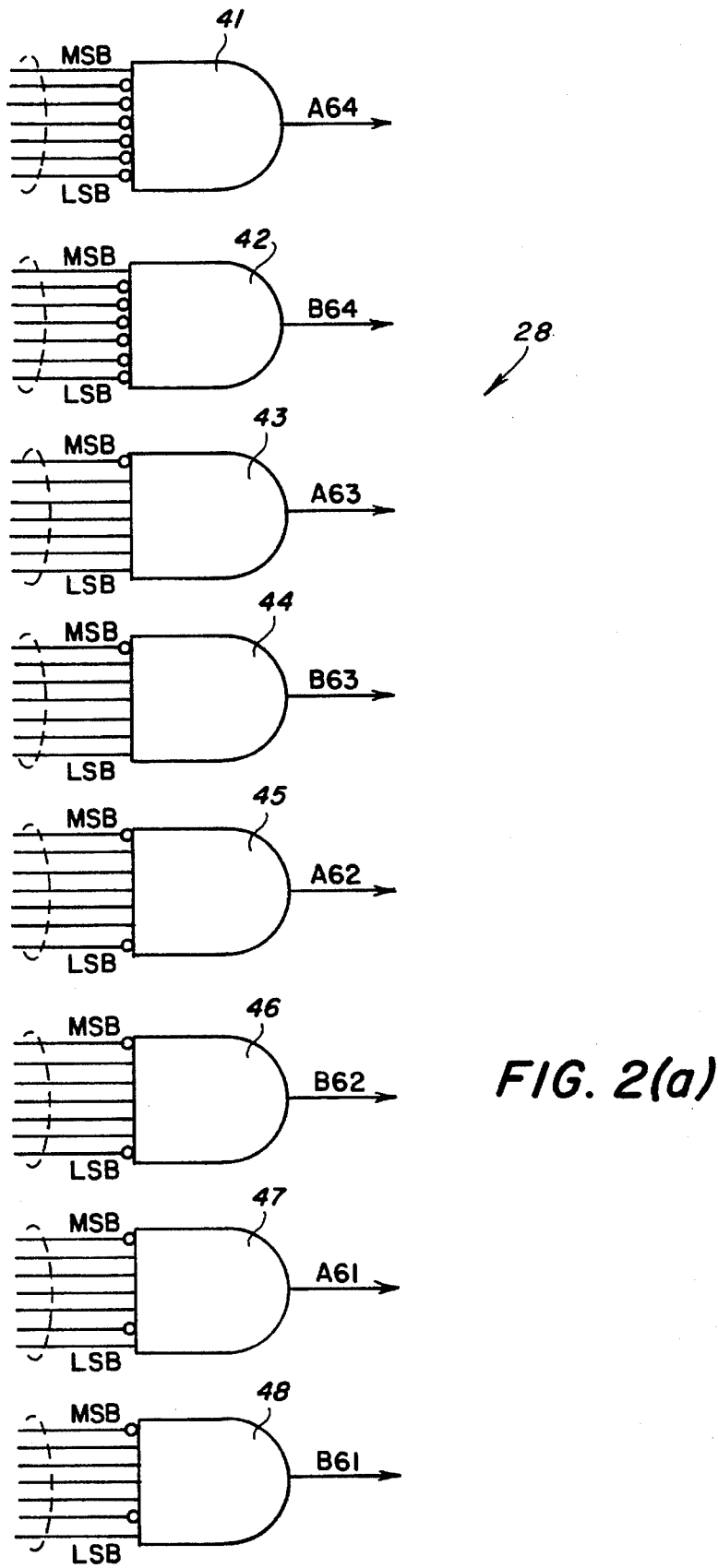
FIG. 2(a) illustrates a schematic block diagram of the decoder stage of the programmable logic array of FIG. 2.

FIG. 2(a) illustrates a schematic block diagram of the decoder stage 28 of FIG. 2. Decoder stage 28 is comprised of AND gates 41–48, each having 7 input terminals. The 7-bit multibit number from the A correlator 16 is applied to each of AND gates 41, 43, 45 and 47, while the 7-bit multibit number from the B correlator 20 is applied to each of AND gates 42, 44, 46 and 48.

All of the input terminals of each of AND gates 41 and 42 are inverted except the most significant bit (MSB) input terminal to enable the AND gates 41 and 42 to respectively develop A64 and B64 outputs. Only the MSB input terminal of each of AND gates 43 and 44 is inverted to enable the AND gates 43 and 44 to respectively develop A63 and B63 outputs. Only the MSB and the least significant bit (LSB) input terminals of each of AND gates 45 and 46 are inverted to enable the AND gates 45 and 46 to respectively develop A62 and B62 outputs. Finally, only the MSB and the second least significant bit (2nd LSB) input terminals of each of AND gates 47 and 48 are inverted to enable the AND gates 47 and 48 to respectively develop A61 and B61 outputs.

In operation, A64 only goes to a 1-state when the 7-bit number from A correlator 16 is 64, A63 only goes to a 1-state when the 7-bit number from A correlator 16 is 63, A62 only goes to a 1-state when the 7-bit number from A correlator 16 is 62, and A61 only goes to a 1-state when the 7-bit number from A correlator 16 is 61. Similarly, B64 only goes to a 1-state when the 7-bit number from B correlator 20 is 64, B63 only goes to a 1-state when the 7-bit number from B correlator 20 is 63, B62 only goes to a 1-state when the 7-bit number from B correlator 20 is 62, and B61 only goes to a 1-state when the 7-bit number from B correlator 20 is 61. The configuration of the binary inputs of each of the AND gates 41–48 is shown in TABLE 1 for the various correlated outputs of both of the correlators 16 and 20.

Figure 2B:
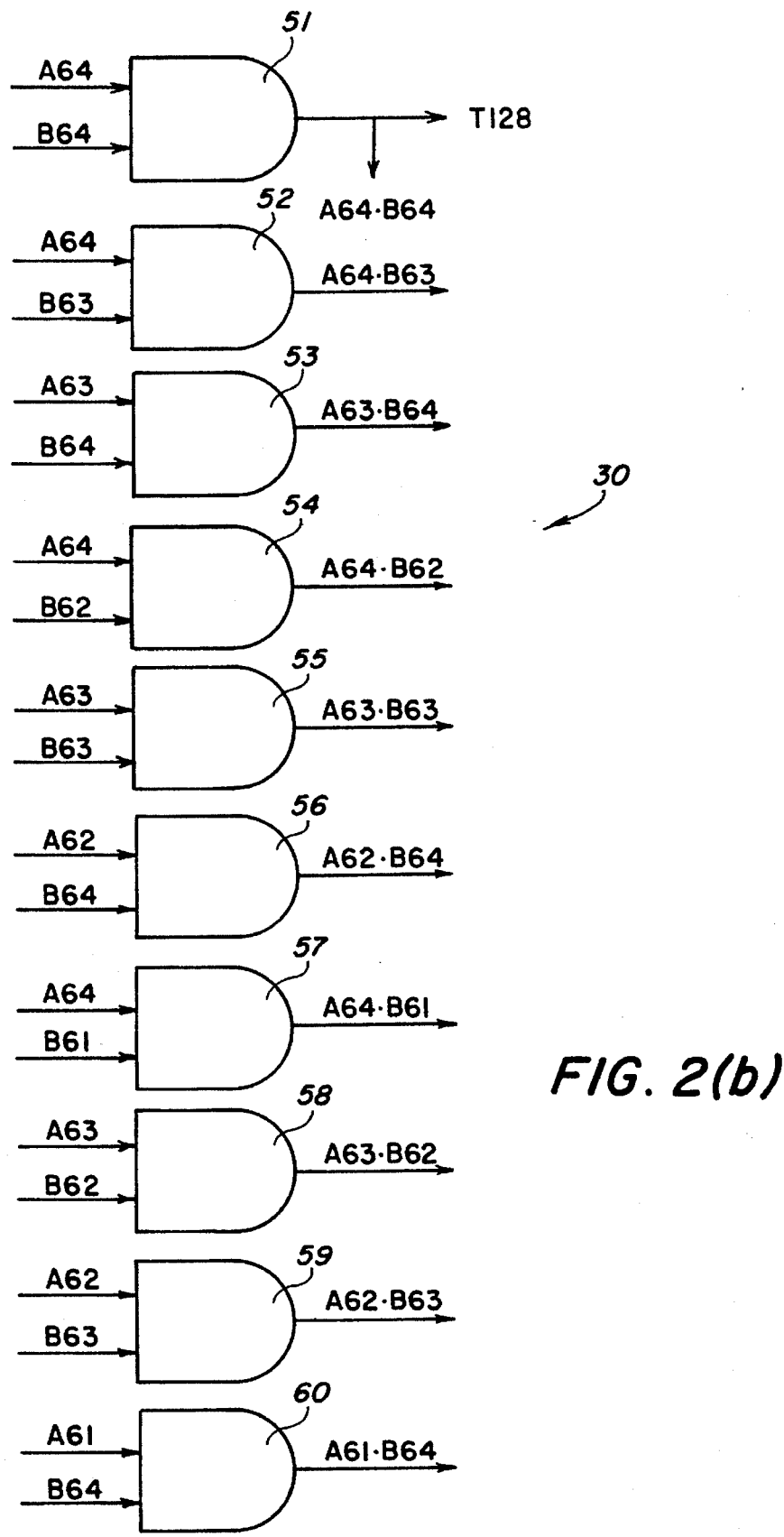
FIG. 2(b) illustrates a schematic block diagram of the product stage of the programmable logic array of FIG. 2.

FIG. 2(b) illustrates a schematic block diagram of the product stage 30 of FIG. 2. Product stage 30 is comprised of AND gates 51–60, which selectively receive an associated pair of the decode signals developed by the decoder stage 28 of FIG. 2 to respectively develop the associated plurality of product terms or signals shown in the previously discussed threshold equations for the thresholds of 128, 127, 126 and 125. More specifically, A64 and B64 are ANDed by AND gate 51 to develop the product term A64·B64; A64 and B63 are ANDed by AND gate 52 to develop the product term A64·B63; A63 and B64 are ANDed by AND gate 53 to develop the product term A63·B64; A64 and B62 are ANDed by AND gate 54 to develop the product term A64·B62; A63 and B63 are ANDed by AND gate 55 to develop the product term A63·B63; A62 and B64 are ANDed by AND gate 56 to develop the product term A62·B64; A64 and B61 are ANDed by AND gate 57 to develop the product term A64·B61; A63 and B62 are ANDed by AND gate 58 to develop the product term A63·B62; A62 and B63 are ANDed by AND gate 59 to develop the product term A62·B63; and A61 and B64 are ANDed by AND gate 60 to develop the product term A61·B64. It should be noted that the product term A64·B64 at the output of AND gate 51 is the threshold signal for $T_{128}$.

Figure 2C:
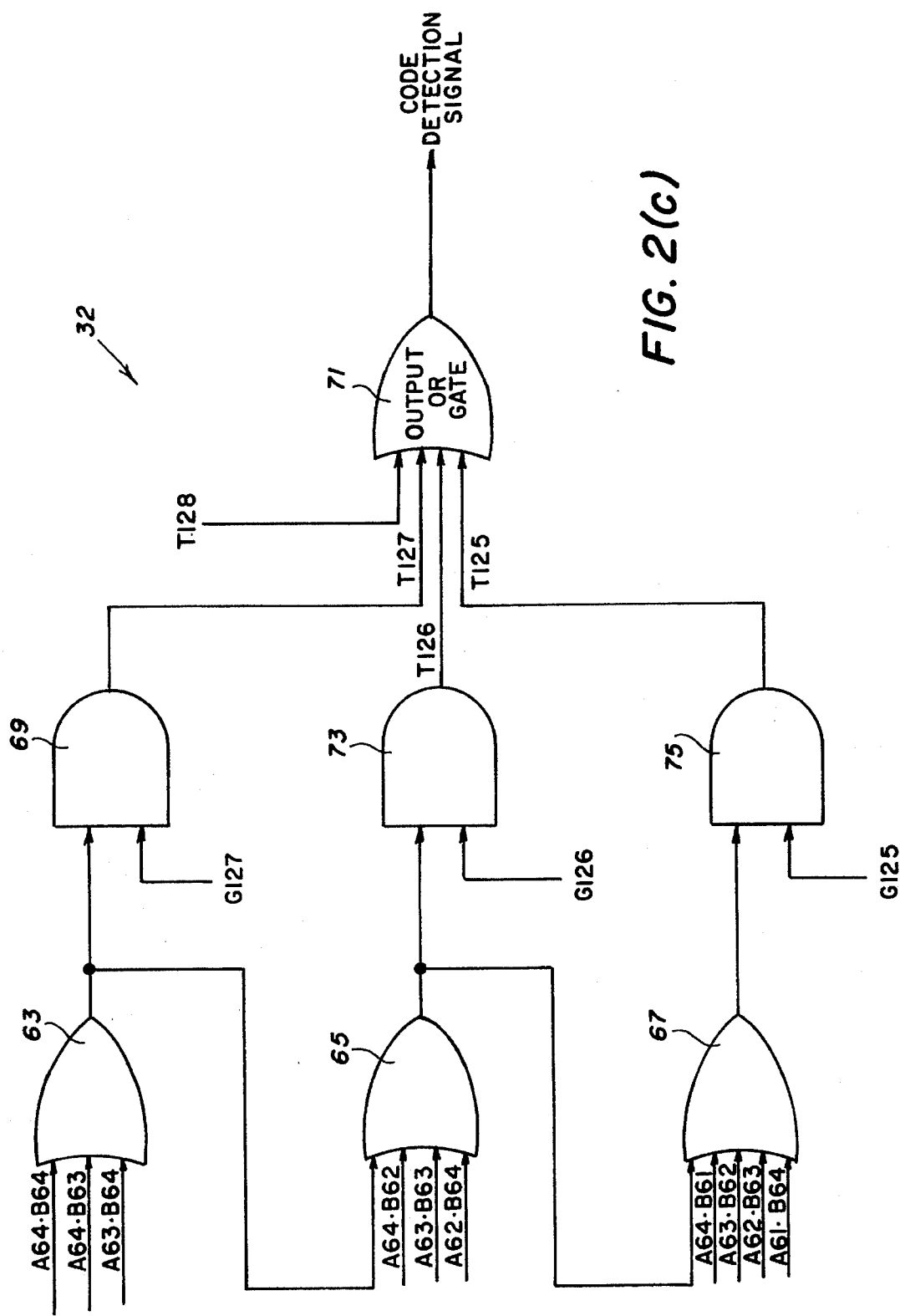
FIG. 2(c) illustrates a schematic block diagram of the code detection stage of the programmable logic array of FIG. 2.

FIG. 2(c) illustrates a schematic block diagram of the code detection stage 32 of FIG. 2. In this code detection stage 32, the product terms of the AND gates 51–60 of the product stage of FIG. 2(b) are selectively applied to OR gates 63, 65 and 67.

OR gate 63 receives the product terms A64·B64 (which is the $T_{128}$ output or function), A64·B63 and A63·B62 to develop the threshold function $T_{127}$. This threshold function $T_{127}$ is ANDed in an AND gate 69 with a threshold selection bit $G_{127}$ (to be explained). When the threshold selection bit $G_{127}$ is a logical 1, AND gate 69 is enabled to pass $T_{127}$ to an output OR gate 71.

OR gate 65 receives $T_{127}$ from the output of OR gate 63, and the product terms A64·B62, A63·B63 and A62·B64 to develop the threshold function $T_{126}$. This threshold function $T_{126}$ is ANDed in an AND gate 73 with a threshold selection bit $G_{126}$ (to be explained). When the threshold selection bit $_{126}$ is a logical 1, AND gate 73 is enabled to pass $T_{126}$ to the output OR gate 71

OR gate 67 receives $T_{126}$ from the output of OR gate 65, and the product terms A64·B61, A63·B62, A62·B63 and A61·B64 to develop the threshold function $T_{125}$. This threshold function $T_{125}$ is ANDed in an AND gate 75 with a threshold selection bit $G_{125}$ (to be explained). When the threshold selection bit $G_{125}$ is a logical 1, AND gate 75 is enabled to pass $T_{125}$ to the output OR gate 71.

The output OR gate 71 receives threshold functions $T_{128}$ (from AND gate 51 in FIG. 2(b)), $T_{127}$ (from AND gate 69), $T_{126}$ (from AND gate 73) and $T_{125}$ (from AND gate 75). When any of these threshold functions is a logical 1, the output OR gate 71 produces a 1-state code detection signal to indicate that the 128-bit digital code has been detected, within a preselected allowance for bit errors, in the input serial digital data stream.

Figure 2D:
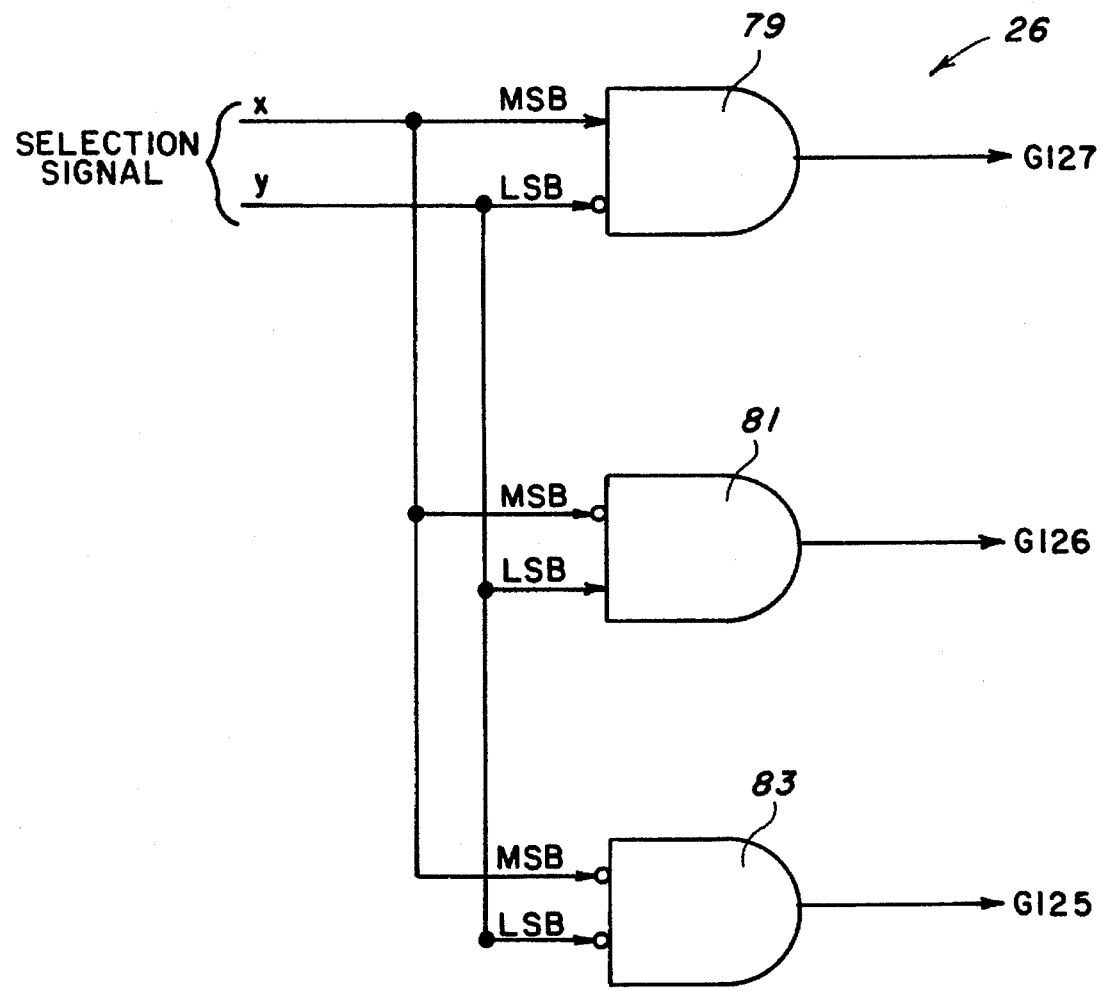
FIG. 2(d) illustrates a schematic block diagram of an exemplary threshold selection code generator of the programmable logic array of FIG. 2.

Referring now to FIG. 2(d), an schematic block diagram of an exemplary threshold selection code generator 26 of FIG. 1 is shown. The threshold selection code generator 26 is comprised of AND gates 79, 81 and 83, each having two inputs. The LSB input terminal of AND gate 79 is inverted, the MSB input terminal of AND gate 81 is inverted, and both of the input terminals of AND gate 83 are inverted.

In operation, the 2-bit selection signal, xy, is applied to each of the AND gates 79, 81 and 83. As previously discussed, when xy=10, AND gate 79 is enabled to develop the threshold selection bit $G_{127}$. The threshold selection bit $G_{127}$ enables the code detection stage 32 (FIG. 2(c)) to generate a code detection signal when the total number of bit agreements of the two 7-bit multibit numbers equal or exceeds a threshold value of 127. Thus, a code detection signal will be generated if there are 127 or 128 bit agreements.

When xy=01, AND gate 81 is enabled to develop the threshold selection bit $G_{126}$. Threshold selection bit $G_{126}$ enables the code detection stage 32 to generate a code detection signal when the total number of bit agreements of the two 7-bit multibit numbers equal or exceeds a threshold value of 126. Thus, a code detection signal will be generated if there are 126, 127 or 128 bit agreements.

When xy=00, AND gate 83 is enabled to develop the threshold selection bit $G_{125}$. Threshold selection bit $G_{125}$ enables the code detection stage 32 to generate a code detection signal when the total number of bit agreements of the two 7-bit multibit numbers equal or exceeds the threshold value of 125. Thus, a code detection signal will be generated if there are 125, 126, 127 or 128 bit agreements.

Therefore, what has been described in a preferred embodiment of the invention is a digital correlator threshold circuit which is comprised of: first and second serially-coupled correlators respectively responsive to first and second digital code portions of a preselected code word and to an data stream passing through the first and second serially-coupled correlators for periodically producing first and second multibit numbers, respectively, in response to a first and second digital code portion of a preselected code word from a programmable memory device and an input data stream passing therethrough. The first and second multibit numbers are representative of the number of bit agreements between the bits in the digital data stream and the bits in the first and second digital code portion. When the logic function provided by a programmable logic array determines that the combined number of bit agreements in both the first and second multibit numbers are at least equal to a preselected threshold number, an output signal is generated.

It should therefore readily be understood that many modifications and variations of the present invention are possible within the purview of the claimed invention. For example, the case of N=2 correlators extends in a straightforward manner to applications of the concepts of the invention in other embodiments of the invention where N is greater than 2. It is therefore to be understood that, within the scope of the appended claims, the invention may be practiced otherwise than as specifically described.

What is claimed as desired to be secured by Letters Patent of the United States is:

1. A digital threshold circuit comprising:

means for storing a preselected code word having first and second digital code portions;

first means responsive to said first digital code portion from said storing means and to an input serial digital data stream passing through said first means for periodically producing a first multibit number representative of the number of bit agreements between the bits in the serial digital data stream and the bits in said first digital code portion;

second means responsive to said second digital code portion from said storing means and to the serial digital data stream passing through said second means from said first means for periodically producing a second multibit number representative of the number of bit agreements between the bits in the serial digital data stream from said first means and the bits in said second digital code portion;

means for developing a preselected threshold number; and means responsive to said first multibit number from said first means, to said second multibit number from said second means and to said preselected threshold number from said developing means for generating an output signal when the number of bit agreements in both of said first and second multibit numbers is at least equal to the preselected threshold number.

2. The digital threshold circuit of claim 1 wherein said developing means includes:

means for determining and applying to said generating means a selection signal indicative of the desired preselected threshold number, said generating means being responsive to said selection signal for selecting only the number of bit agreements in both of said first and second multibit numbers which is at least equal to said desired preselected threshold number.

3. The digital threshold circuit of claim 1 wherein:

each of said first and second means is a digital correlator.

4. The digital threshold circuit of claim 1 wherein:

said generating means is a programmable logic array.

5. The digital threshold circuit of claim 1 wherein:

said generating means is a computer.

6. The digital threshold circuit of claim 1 wherein:

said storing means is a programmable read-only memory.

7. The digital threshold circuit of claim 1 wherein:

said storing means is a computer.

8. The digital threshold circuit of claim 1 wherein:

said storing means is a shift register.

9. The digital threshold circuit of claim 1 wherein:

said storing means is selected from the group consisting of a read-only memory, a computer, and a shift register.

10. The digital threshold circuit of claim 1 wherein:

each of said first and second means is a digital correlator;

said generating means is selected from the group consisting of a programmable logic array and a computer.

11. A computer implemented method for achieving digital correlation with thresholding, said method comprising the computer implemented steps of:

storing a preselected code word having first and second digital code portions;

periodically producing from a first correlator a first multibit number representative of the number of bit agreements between the bits in the first digital code portion and the bits in an input serial digital data stream passing through the first correlator;

periodically producing from a second correlator a second multibit number representative of the number of bit agreements between the bits in the second digital code portion and the bits in the serial digital data stream from the first correlator passing through the second correlator;

developing a preselected threshold number; and generating an output signal when the number of bit agreements in both of the first and second multibit numbers is at least equal to the preselected threshold number.

12. The method of claim 11 wherein the developing step includes the step of:

selecting the preselected threshold number from a plurality of different preselected threshold numbers.

13. A digital threshold circuit comprising:

means for storing a preselected code word having first and second digital code portions;

a first digital correlator responsive to said first digital code portion from said storing means and to an input serial digital data stream passing through said first digital correlator for periodically producing a first multibit number representative of the number of bit agreements between the bits in the serial digital data stream and the bits in said first digital code portion;

a second digital correlator responsive to said second digital code portion from said storing means and to the serial digital data stream passing through said second digital correlator from said first digital correlator for periodically producing a second multibit number representative of the number of bit agreements between the bits in the serial digital data stream from said first digital correlator and the bits in said second digital code portion;

programmable means responsive to said first multibit number from said first digital correlator and to said second multibit number from said second digital correlator for generating a code detection pulse when the number of bit agreements in both of said first and second multibit numbers is at least equal to a preselected threshold number; and means for selectively generating and applying the predetermined threshold number to said programmable means.

14. The digital threshold circuit of claim 13 wherein:

said storing means is a computer.

15. The digital threshold circuit of claim 13 wherein:

said storing means is a programmable read-only memory device.

16. The digital threshold circuit of claim 15 wherein:

said storage means is selected from the group consisting of a computer, a read-only memory, a programmable read-only memory, an electrically erasable electronically programmable read-only memory, and a shift register.

17. The digital threshold circuit of claim 13 wherein:

said programmable means is a programmable logic array.

18. The digital threshold circuit of claim 13 wherein:

said programmable means is selected from the group consisting of a programmable logic array, a microprocessor and a computer.

19. The digital threshold circuit of claim 13 wherein:

said means for selectively generating a predetermined threshold value is selected from a group consisting of a switching circuit, a logic array, a microprocessor and a computer.

20. A computer implemented method for generating a code detection pulse for a preselected threshold code comprising the computer implemented steps of:

storing a preselected code word having first and second digital code portions;

periodically producing first and second multibit numbers representative of the number of bit agreements between the bits in an input serial digital data stream and the bits of each of the respective stored first and second digital code portions;

providing a preselected threshold number; and generating the code detection pulse when the number of bit agreements in both of said first and second multibit numbers is at least equal to the preselected threshold number.

\* \* \* \* \*